(12) United States Patent
Maruyama et al.

(10) Patent No.: US 7,462,967 B2
(45) Date of Patent: Dec. 9, 2008

(54) FLAT HOLLOW BRUSHLESS SERVO MOTOR WITH TOOL MOUNTING HOLE

(75) Inventors: Toshiki Maruyama, Nagano (JP); Akihiro Yokoyama, Nagano (JP)

(73) Assignee: Harmonic Drive Systems Inc., Tokyo (JP)

( * ) Notice: Subject to any disclaimer, the term of this patent is extended or adjusted under 35 U.S.C. 154(b) by 441 days.

(21) Appl. No.: 10/529,188

(22) PCT Filed: Jul. 14, 2004

(86) PCT No.: PCT/JP2004/010011

§ 371 (c)(1),
(2), (4) Date: Mar. 24, 2005

(87) PCT Pub. No.: WO2005/013463

PCT Pub. Date: Feb. 10, 2005

(65) Prior Publication Data

US 2006/0163955 A1    Jul. 27, 2006

(30) Foreign Application Priority Data

Aug. 4, 2003    (JP)    ............................. 2003-285505

(51) Int. Cl.
*H02K 7/02*    (2006.01)
(52) U.S. Cl. ........................... 310/75 D; 310/89; 310/90
(58) Field of Classification Search ............... 310/68 B, 310/68 R, 49 R, 81, 261, 75 D, 89, 90, 268
See application file for complete search history.

(56) References Cited

U.S. PATENT DOCUMENTS

| | | | | |
|---|---|---|---|---|
| 2,364,599 A | * | 12/1944 | Burrus | ........................ 464/182 |
| 3,469,124 A | * | 9/1969 | Willcox | .................... 310/49 R |
| 4,125,790 A | * | 11/1978 | Stratienko | .................. 310/75 D |
| 5,319,271 A | * | 6/1994 | Shimada et al. | ........... 310/68 B |
| 5,614,775 A | * | 3/1997 | Horski et al. | .............. 310/68 R |
| 5,770,900 A | * | 6/1998 | Sato et al. | .................. 310/49 R |
| 5,982,063 A | * | 11/1999 | Lutz et al. | ...................... 310/77 |
| 6,417,589 B1 | * | 7/2002 | Kuyama et al. | ............... 310/81 |
| 6,424,061 B1 | * | 7/2002 | Fukuda et al. | ............ 310/49 R |
| 2002/0135241 A1 | | 9/2002 | Kobayashi et al. | |

FOREIGN PATENT DOCUMENTS

| | | |
|---|---|---|
| JP | 03-54352 | 5/1991 |
| JP | 11-206077 | 7/1999 |
| JP | 11-266559 | 9/1999 |
| JP | 02-243000 | 8/2002 |

OTHER PUBLICATIONS

European Search Report dated May 3, 2007 (3 sheets).

* cited by examiner

*Primary Examiner*—Dang D Le
(74) *Attorney, Agent, or Firm*—Flynn, Thiel, Boutell & Tanis, P.C.

(57) ABSTRACT

A flat, hollow brushless servomotor (1) has a motor housing (2), housing through holes (22a, 23a) formed in a center of both end plate portions (22, 23), a rotor shaft (41) of which a portion of both ends is exposed from the through holes, a tool-mounting hole (43) that extends through a center thereof, and workpiece insertion recesses (24, 25) formed in an external surface of both end plate portions (22, 23) of the motor housing (2) by reducing the thickness thereof. A workpiece with a shape that has facing portions facing each other across a narrow space can be introduced from an outside to a center of the motor (1) along the workpiece insertion recesses, and the facing portions of the workpiece can be machined by a tool mounted in the center of the motor.

18 Claims, 2 Drawing Sheets

FLAT HOLLOW BRUSHLESS SERVO MOTOR WITH TOOL MOUNTING HOLE

TECHNICAL FIELD

The present invention relates to an SPM-type brushless servomotor in which a ring magnet is used as a rotor, and particularly relates to a flat, hollow brushless servomotor whose length in an axial direction is short, and that is provided with a tool-mounting hole.

BACKGROUND ART

An example of a hollow brushless servomotor is disclosed in the patent document 1 listed below. In the motor cited therein, an encoder is disposed in a rear end portion of a motor output shaft, and a front-end portion of the hollow motor output shaft is adapted to be engaged with a load side via a reduction gear.

PATENT DOCUMENT 1: JP-U 03-54352

DISCLOSURE OF THE INVENTION

Problem to be Solved by the Invention

An object of the present invention is to provide a flat, hollow brushless servomotor that is suitable for applications in which a tool is directly mounted on a rotational shaft of the motor and a workpiece is pressed from both sides thereof to carry out predetermined machining.

Means of Solving the Problems

A flat, hollow brushless motor of the present invention has:
a flattened tubular motor housing sealed at both ends;
first and second housing through holes formed in a center of first and second end plate portions on both sides of the motor housing;
a rotor shaft of which a portion of both ends is exposed from the first and second housing through holes;
a tool-mounting hole that extends through a center of the rotor shaft; and
first and second workpiece insertion recesses formed in external surfaces of the first and second end plate portions of the motor housing; wherein
the first workpiece insertion recess is formed in a circular area encompassing the first housing through hole, and in an area with a predetermined width extending in a radial direction to an external peripheral edge of the motor housing continuously with the circular area in the external surface of the first end plate portion; and
the second workpiece insertion recess is formed in a circular area encompassing the second housing through hole, and in an area with a predetermined width extending to an external peripheral edge of the motor housing continuously with the circular area in the external surface of the second end plate portion.

Here, the tool-mounting hole is preferably a hexagonal or another polygonal cross section.

The maximum length in an axial direction of the rotor shaft is preferably equal to or less than the thickness between bottom faces of the first and second workpiece insertion recesses in the first and second end plate portions on both sides of the motor housing.

Furthermore, the present invention preferably has a lead wire laying area extending to an outside in a radial direction from an external peripheral face of the motor housing, wherein lead wires disposed along a recess groove formed on an inside surface of the first or second end plate portion of the motor housing are brought out to the lead wire laying area.

The present invention also preferably has a detection mechanism for detecting a motor magnetic pole position, wherein the detection mechanism comprises an FG magnet disposed on one end face of the rotor shaft, and a Hall element or another magnetic sensor disposed in an inside surface area of the first or second end plate portion facing the FG magnet in the motor housing.

Effects of the Invention

In the brushless motor of the present invention, first and second workpiece insertion recesses are formed extending in the radial direction on the external surface of the end plate portion on both sides of the motor housing, and the portions on which the recesses are formed are the thinnest portions in the axial direction in the motor housing. Since the hollow portion of the rotor shaft that has a length which allows it to be accommodated in the motor housing is used as the tool-mounting hole, the tool-mounting portion does not protrude in the axial direction from both sides of the motor housing. The lead wire laying area extends in the radial direction from the external peripheral face of the motor housing, and naturally does not protrude in the axial direction from both ends of the motor housing. Since the lead wires in the motor housing are brought out along the recess groove formed by reducing the thickness of the end plate portion of the motor housing, a space for bringing out the lead wires does not protrude in the axial direction from both ends of the motor housing. Additionally, a space for installing components for the detection mechanism is also provided in the motor housing by using a gap between the first or second end plate portion and the end face of the rotor shaft. Therefore, in accordance with the present invention, a hollow brushless servomotor provided with a very flat tool-mounting hole can be realized.

Hence, the brushless servomotor with the tool-mounting hole of the present invention is suitable for use as a machine tool that carries out predetermined machining to facing portions of a workpiece provided with facing portions that face each other across a narrow space as follows. That is to say, the brushless servomotor is thin and can therefore be inserted between the facing portions that face each other across the narrow space in the workpiece. When a tool is mounted on the rotor shaft of the brushless servomotor, and in this state the facing portions of the workpiece are introduced along the first and second workpiece insertion recesses from the outside toward the tool at the center in the radial direction of the motor, a tip of the facing portions can be pressed to the tool. In this state, the brushless servomotor is rotatably driven, and predetermined machining can be carried out on the workpiece by means of the tool.

Best Mode for Carrying out the Invention

An SPM-type brushless DC servomotor according to the present invention is described below with reference to the drawings.

FIG. 1 is a cross-sectional view along a surface containing an axis of a brushless DC servomotor in accordance with the present embodiment, FIG. 2 is an end face view of the motor of FIG. 1 as seen from the direction of an arrow A, and FIG. 3 is an end face view of the motor of FIG. 1 as seen from the direction of an arrow B. A brushless DC servomotor 1 has a flattened tubular motor housing 2 sealed at both ends, and a stator assembly 3 and a rotor assembly 4 are coaxially mounted inside the motor housing 2.

The stator assembly 3 is provided with a ring core 31 composed of magnetic material, and a drive coil 33 wound about a salient pole of the ring core 31 via an insulator 32, and is coaxially mounted on an inside peripheral surface of a cylindrical trunk 21 of the motor housing 2. The motor of the present example has a 20-pole, 24-slot configuration.

The rotor assembly 4 is coaxially disposed inside the stator assembly 3, and is provided with a hollow rotor shaft 41 and a ring magnet 42 fixed to a circular external peripheral surface of the rotor shaft 41, and the ring magnet 42 faces the stator assembly 3 via a slight gap. The rotor shaft 41 has a cross-sectional shape provided with a internal peripheral side portion 44 in which a tool-mounting hole 43 is formed completely through its center, an external peripheral side portion 45 facing the stator assembly 3, and a narrow width portion 46 providing a link therebetween, and ball bearings 47 and 48 are disposed in toroidal recesses formed in both sides of the narrow width portion 46. An oil seal 49 is disposed on an outside of the ball bearings 47. The rotor assembly 4 is rotatably supported by the motor housing 2 by way of the ball bearings 47 and 48. In the present example, the tool-mounting hole 43 formed in the rotor shaft 41 is configured such that a first end plate portion 22 side is a large diameter portion 43a, and a portion 43b on a second end plate portion 23 side has a hexagonal cross section with a narrower width thereof.

As described above, the motor housing 2 has the cylindrical trunk 21 as well as end plate portions 22 and 23 that seal both ends thereof, and circular through holes 22a and 23a are formed in the center of the end plate portions 22 and 23. Both end faces 45a and 45b of the internal peripheral side portion 44 of the rotor shaft 41 are exposed via the circular through holes 22a and 23a, respectively. First and second workpiece insertion recesses 24 and 25 are formed to a fixed depth in circular areas containing the circular through holes 22a and 23a, and in areas extending in a radial direction to an external peripheral edge of the end plate portion continuously with the circular areas on an outside surface of the end plate portions 22 and 23. The workpiece insertion recesses 24 and 25 are formed by reducing the thickness of the end plate portions 22 and 23 to a fixed width. A length in an axial direction of the rotor shaft 41 is equal to or less than the thickness between bottom faces of the workpiece insertion recesses 24 and 25, and both end faces of the rotor shaft 41 substantially match the bottom faces of the recesses 24 and 25 in the present example.

Next, a ring-shaped FG magnet 51 is mounted on a toroidal end face 44a facing the end plate portion 22 of the motor housing 2 in the external peripheral side portion 45 of the rotor shaft 41. A sensor board 53 on which three Hall elements 52 are arranged in a circumferential direction is mounted on an inside surface of the end plate portion 22 facing the FG magnet 51. A magnetic position detection mechanism 5 is composed of the FG magnets 51 and Hall elements 52.

Here, a lead wire laying area 6 from the drive coil 33 and sensor board 53 protrudes from an external peripheral surface of the cylindrical trunk 21 of the motor housing 2 to an exterior in a radial direction, and has a thickness that fits within a thickness in the direction of an axis 1a of the motor housing 2. Also, a recess groove 26 for bringing out a lead wire is formed by reducing the thickness on an inside surface of the end plate portion 22 of the motor housing 2 in order to bring out lead wires from the sensor board 53.

It should be noted that the motor housing 2 of the present example has a configuration in which the cylindrical trunk 21 and the end plate portion 23 are integrally formed, and the end plate portion 22 is fixedly fastened to a toroidal end face of the cylindrical trunk 21. Also, a mounting flange 27 extends toward the external side in the radial direction from the external peripheral side portion of the cylindrical trunk 21, and the motor 1 is fixed to a fixed side portion (not shown) by the mounting flange 27. Furthermore, an external side face 23b of the end plate portion 23 is a heat-dissipating surface on which an uneven surface is radially provided.

Motor components are mounted in the flattened tubular motor housing 2 in the brushless DC servomotor 1 with the above configuration, and tools (not shown) are directly mountable in the tool-mounting hole 43 of the rotor shaft 41 exposed from the center through holes 22a and 23a of the end plate portions 22 and 23. Also, a portion where the thickness in the direction of the axis 1a is thin is formed in the motor housing 2 by forming workpiece insertion recesses 24 and 25 on the outside surface of the two end plate portions 22 and 23 of the motor housing 2, and a workpiece (not shown) provided with facing portions across a space narrower than the width of the axial direction of the motor housing 2 can be introduced from the outside in the radial direction into both end portions of the tool-mounting hole 43 of the rotor shaft 41.

The end plate portion 22 of the motor housing 2 is made thinner to provide the recess groove 26 used to bring out the lead wire, and is made to allow the lead wire laying area 6 to fit within the thickness dimension of the motor housing 2. Also, the magnetic position detection mechanism 5 is disposed further inside a torque-generating portion (a portion in which the rotor assembly 4 and the stator assembly 3 face each other) in the radial direction, and the mechanism is configured to avoid extending the length in the axial direction of the motor. Therefore, a very flat, hollow brushless DC servomotor can be realized.

Figure 1:
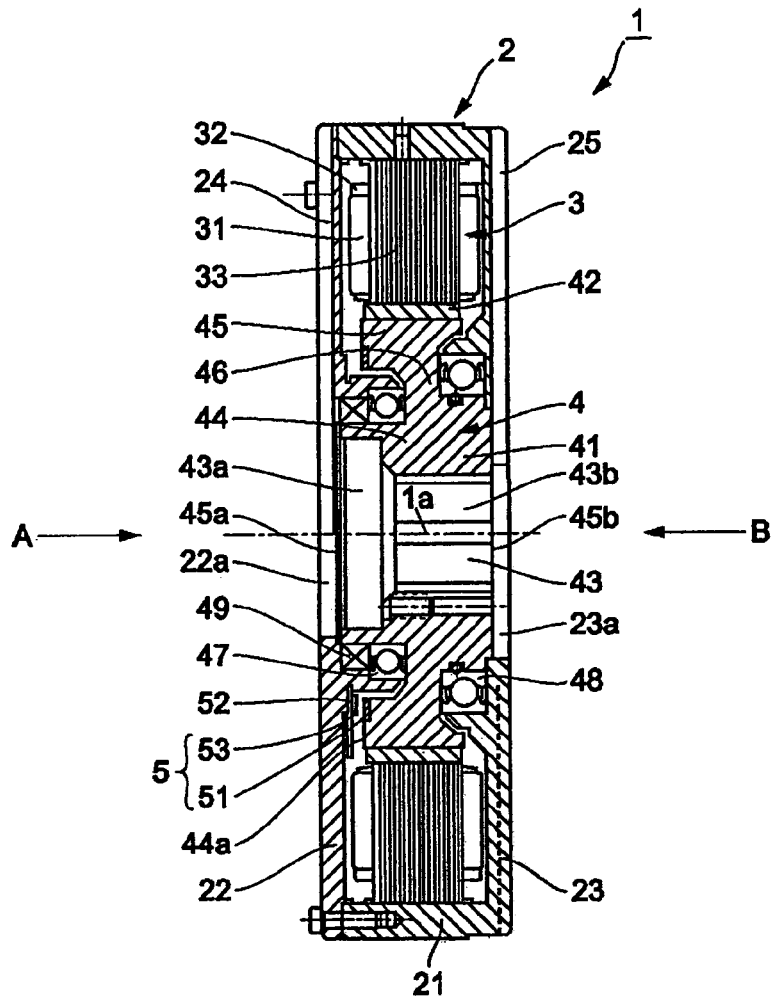
FIG. 1 is a cross-sectional view along a surface containing an axis of a brushless DC servomotor according to the present invention.
Figure 2:
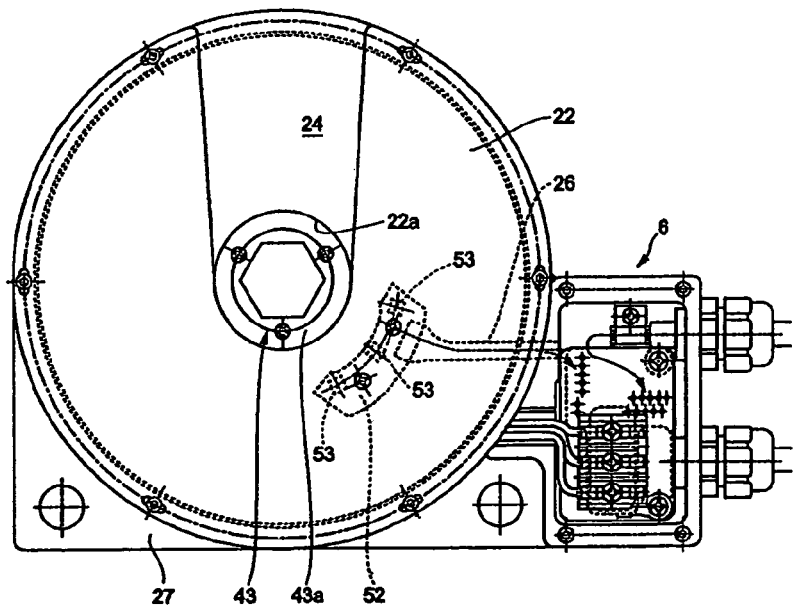
FIG. 2 is an end face view of the motor of FIG. 1 as seen from the direction of the arrow A.
Figure 3:
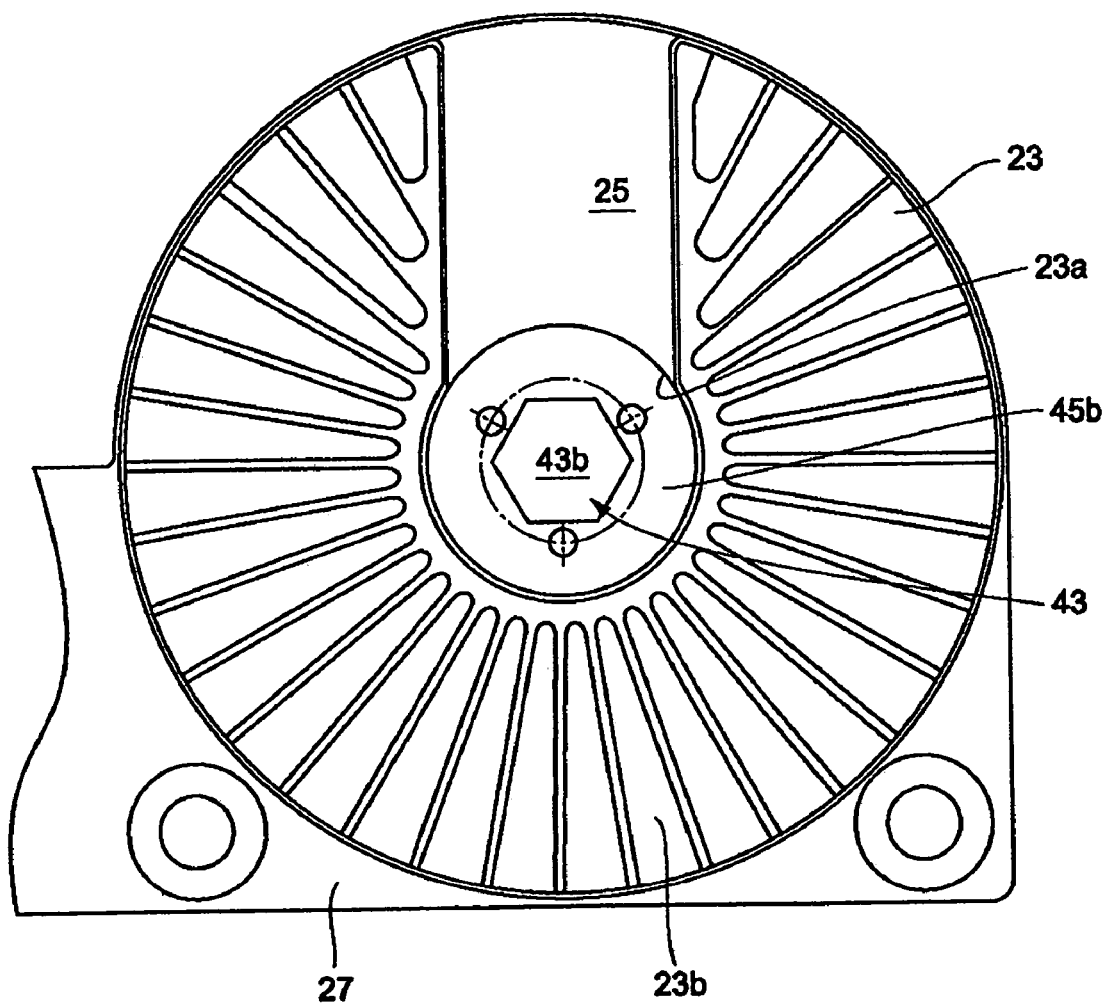
FIG. 3 is an end face view of the motor of FIG. 1 as seen from the direction of the arrow B.

DESCRIPTION OF THE SYMBOLS 1 motor
2 motor housing
21 cylindrical trunk
22, 23 end plate portion
22a, 23a circular through hole
24, 25 workpiece insertion recess
26 recess groove for bringing out lead wire
27 mounting flange
3 stator assembly
31 ring core
33 drive coil
4 rotor assembly
41 rotor shaft
42 ring magnet
43 tool-mounting hole
47, 48 ball bearing
5 magnetic position detection mechanism
51 FG magnet
52 Hole element
6 lead wire laying area

What is claimed is:

1. A flat, hollow brushless motor comprising:
a flattened tubular motor housing sealed at both ends,
first and second housing through holes formed in a center of first and second end plate portions on both sides of the motor housing,
a rotor shaft of which a portion of both ends is exposed from the first and second housing through holes,
a tool-mounting hole that extends through a center of the rotor shaft and that has both ends thereof exposed from the first and second housing through holes, and
first and second workpiece insertion recesses formed in outer surfaces of the first and second end plate portions of the motor housing,
wherein the first and second workpiece insertion recesses are formed with a fixed depth in central areas containing the housing through holes, and in areas extending in a radially same direction to external peripheral edges of the end plate portions continuously with the central edges on the outside surfaces of the end plate portions, so that the end plate portions have a reduced thickness at the work piece insertion recesses.

2. The flat, hollow brushless motor according to claim 1, wherein the tool-mounting hole has a hexagonal cross section.

3. The flat, hollow brushless motor according to claim 1, wherein the maximum length in an axial direction of the rotor shaft is less than the thickness between bottom faces of the first and second workpiece insertion recesses in the first and second end plate portions on both sides of the motor housing.

4. The flat, hollow brushless motor according to claim 1, comprising a lead wire laying area extending to an outside in a radial direction from an external peripheral surface of the motor housing,
wherein lead wires disposed along a recess groove formed on an inside surface of the first or second end plate portion of the motor housing are brought out to the lead wire laying area.

5. The flat, hollow brushless motor according to claim 1, comprising a detection mechanism for detecting motor magnetic pole positions,
wherein the detection mechanism comprises an FG magnet disposed on one end face of the rotor shaft, and a magnetic sensor disposed on an internal surface of the first or second end plate portion facing the FG magnet in the motor housing.

6. A flat, hollow brushless servomotor comprising:
a tubular motor housing sealed at both ends;
first and second flat end plates closing respective outer sides of said motor housing and forming outer end surfaces thereof, said end plates having central through holes formed therein;
a hollow rotor shaft located within respective planes defined by the parallel outer end surfaces of said first and second end plates and including a tool-mounting hole extending axially through a center thereof so that said central through holes and said tool-mounting hole are axially aligned to provide a central axially oriented open aperture extending through said brushless servomotor;
a first workpiece insertion recess formed in an external surface of said first end plate, said first workpiece insertion recess extending radially from said central aperture to an outer periphery of said first end plate; and
a second workpiece insertion recess formed in an external surface of said second end plate, said second workpiece insertion recess extending radially from said central aperture to an outer periphery of said second end plate.

7. The brushless servomotor according to claim 6, wherein the axial length of said rotor shaft is less than the radius of said rotor shaft so that said brushless servomotor is thin to enable insertion between facing portions of a workpiece for machining of the facing portions with a tool mounted in the tool-mounting hole of the rotor shaft and projecting axially outwardly beyond and transverse to the plane defined by the outer end surface of at least one of said end plates.

8. The brushless servomotor according to claim 6, wherein said tool-mounting hole has a hexagonal cross section.

9. The brushless servomotor according to claim 6, including a detection mechanism for detecting motor magnetic pole positions.

10. The brushless servomotor according to claim 9, wherein said detection mechanism comprises a magnet disposed on an end face of the rotor shaft and a magnetic sensor disposed on an inner side of said first end plate.

11. The brushless servomotor according to claim 6, including a lead wire groove disposed on an inner side of said first end plate for receiving lead wires.

12. The brushless servomotor according to claim 6, including a machine tool mounted on the rotor shaft, said machine tool extending axially through said tool-mounting hole and not extending beyond said central through holes so that said servomotor is capable of insertion between axially spaced facing portions of a workpiece.

13. The brushless servomotor according to claim 6, including a cylindrical stator assembly having drive coils and an insulator, said stator assembly disposed radially outwardly about said hollow rotor shaft and within said tubular motor housing.

14. The brushless servomotor according to claim 6, wherein said rotor shaft is entirely within said motor housing.

15. The brushless servomotor of claim 6, wherein said first and second flat end plates comprise essentially parallel end plates, except for said insertion recesses, to define parallel outer end surfaces.

16. A flat, hollow brushless servomotor comprising:
a motor housing sealed at both ends;
first and second flat circular shaped end plates closing respective outer sides of said motor housing and forming outer end surfaces thereof, each said end plate having a central through hole formed therein;
a hollow rotor shaft positioned within said motor housing and between said first and second end plates and including a tool-mounting hole extending axially through a center thereof so that said central through holes and said tool-mounting hole are axially aligned to provide a central axially oriented open aperture extending through said brushless servomotor,
a first workpiece insertion recess formed in an external surface of said first end plate, said first workpiece insertion recess having a constant depth and extending radially from said central aperture to an outer periphery of said first end plate; and
a second workpiece insertion recess formed in an external surface of said second end plate, said second workpiece insertion recess having a constant depth and extending radially from said central aperture to an outer periphery of said second end plate,
wherein said first and second workpiece insertion recesses are oriented symmetrically on said first and second end plates for enabling insertion of said brushless servomotor between spaced and facing portions of a workpiece.

17. The brushless servomotor according to claim 16, wherein an axial length of said tubular motor housing is less than a radius of each said circular shaped plate for enabling insertion of said servomotor between inwardly facing portions of a workpiece.

18. The brushless servomotor according to claim 17, wherein the first and second end plates have a reduced thickness at the workpiece insertion recesses.

* * * * *